United States Patent [19]

Hueckler et al.

[11] Patent Number: 4,895,217
[45] Date of Patent: Jan. 23, 1990

[54] DRIVE SYSTEM FOR TWO PAIRS OF WHEELS

[75] Inventors: Volker Hueckler, Radolfzell; Dieter Nobis, Lonsee-Halzhausen; Reinhard Schwarz, Gondelsheim, all of Fed. Rep. of Germany

[73] Assignee: Deere & Company, Moline, Ill.

[21] Appl. No.: 136,047

[22] Filed: Dec. 21, 1987

[30] Foreign Application Priority Data

Dec. 20, 1987 [DE] Fed. Rep. of Germany ....... 3643831

[51] Int. Cl.$^4$ .................... B60K 17/346; B60K 23/08; B60T 8/32
[52] U.S. Cl. .................................. 180/233; 180/247; 180/248; 180/249
[58] Field of Search ............... 180/249, 247, 248, 250, 180/244, 197, 233; 74/710.5, 713, 665 GB, 665 T, 694, 701, 715; 192/91 A

[56] References Cited

U.S. PATENT DOCUMENTS

| | | |
|---|---|---|
| 3,400,777 | 9/1968 | Hill ....................................... 180/249 |
| 3,748,928 | 7/1973 | Shiber .................................. 74/711 |
| 3,923,113 | 12/1975 | Pagelin ................................. 180/249 |
| 4,318,823 | 3/1982 | Wetrich et al. ....................... 74/339 |
| 4,552,241 | 11/1985 | Suzuki ................................. 180/249 |
| 4,644,823 | 2/1987 | Mueller ............................... 74/710.5 |
| 4,700,797 | 10/1987 | Leiber ................................. 180/249 |
| 4,776,444 | 10/1988 | Worner ............................... 192/91 A |

FOREIGN PATENT DOCUMENTS

| | | |
|---|---|---|
| 90944 | 3/1983 | European Pat. Off. . |
| 7003306 | 1/1970 | Fed. Rep. of Germany . |
| 2138187 | 2/1973 | Fed. Rep. of Germany ...... 180/249 |
| 3545545 | 12/1985 | Fed. Rep. of Germany . |
| 3437435 | 4/1986 | Fed. Rep. of Germany . |
| 3440492 | 5/1986 | Fed. Rep. of Germany . |
| 178040 | 10/1983 | Japan .................................. 180/249 |
| 2093416 | 9/1982 | United Kingdom . |
| 2140104 | 11/1984 | United Kingdom ................ 180/249 |
| 2087809 | 7/1985 | United Kingdom . |
| 2172863 | 10/1986 | United Kingdom ................ 180/249 |

*Primary Examiner*—Mitchell J. Hill

[57] ABSTRACT

A drive system for a four-wheel drive motor vehicle, in particular an agricultural tractor, includes a gradually lockable differential for the front wheels, a gradually lockable differential for the rear wheels, and a gradually lockable center differential in the drive to the front and rear differential gears. The degree of locking of the respective differentials is controlled by a control circuit based upon their relative rotational speeds, the steering angle and the temperature in the center differential. In an alternative embodiment, brakes on each wheel and on the shafts connecting the center differential to the front and rear differential are used to supplement or replace the differential locks.

14 Claims, 6 Drawing Sheets

DRIVE SYSTEM FOR TWO PAIRS OF WHEELS

BACKGROUND OF THE INVENTION

1. Field of the Invention

The present invention relates to drive systems for two pairs of wheels on a motor vehicle, with a differential associated with each pair of wheels and where at least one of the pairs of wheels can be steered. The steering angle and rotational speed of the steered pair of wheels can be determined by means of sensors, and a control circuit selectively operates differential locks associated with the differentials, depending upon the magnitude of the steering angle.

2. Description of the Related Art

West German Pat. No. 34 40 492 teaches an agricultural tractor having front and rear wheels each driven through a differential gear with a differential lock that can be controlled according to load. The drive to the front pair of wheels is taken through a selective clutch from a main transmission. A control circuit is provided for the control of the differential locks and the selective clutch, by means of which the timing and the magnitude of the friction locking of the differential locks is controlled. The control circuit compares reference values stored in its memory of the speed differences between the drive shafts for each set of wheels at all possible steering angles, and compares these to actual values in order to apply, remove or modulate the differential locks. However, the selective clutch can only be fully engaged or disengaged, and basically forms a rigid connection between the front and rear pair of wheels.

This drive system has the disadvantage that, although relative rotation of the wheels of one side with respect to the wheels of the other side during cornering may be accommodated by the control circuit, a stress remains between the front and rear wheels, since at any relative rotation above or below the optimum point the front wheels overrun or underrun the rear wheels. This stress could be relieved by opening the selective clutch by means of a control circuit, but then the flow of power to the front wheels would be interrupted and they would no longer contribute to propulsion of the vehicle.

SUMMARY OF THE INVENTION

The purpose of the present invention is to provide an improved drive system in which the varying peripheral speeds of the front and rear wheels during cornering can be balanced by a control circuit. This purpose is accomplished according to the present invention by providing an additional locking differential gear between the two front and back differential gears whose degree of locking can be regulated by the control circuit.

By this means, a balance of the peripheral speeds of the front and rear wheels can be obtained without interruption of the flow of power to the front or rear wheels. If both wheels of a pair of wheels skid, a moment can be established by means of the third differential lock to avoid applying all the torque to the wheels that are skidding.

To avoid problems if a supply system, such as the control circuit, fails, the differential lock of the additional differential gear is applied by means of a spring and released hydraulically, so that power is available at all wheels, even if not required in a particular situation. The spring may be a mechanical spring, a pressure reservoir, or an electromagnet. This offers the additional advantage that when the vehicle is parked, the front and back wheels are connected under a low stress (due to the normal overrun of the front wheels by 3-5%), which would help deter the vehicle from rolling away.

In the preferred embodiment, distribution of the driving torque between the front and back wheels is obtained by the design of the additional differential gear. For example, agricultural tractors usually have a 30:70 load split between the front and rear wheels, so that a 30:70 torque split is preferred as well. A beveled gear differential can serve this purpose by using different beveled gear sizes, or a planetary differential can be used using different gear ratios.

A temperature sensor preferably is provided on the additional differential gear to detect excessive heat build-up, e.g., during long duration slip at the differential lock. The sensed temperature is fed to the control circuit for use in modifying the degree of locking of the additional differential gear, or it can be used merely to operate a warning device.

Depending upon the equipment of the motor vehicle, individual wheel brakes could be provided, either in place of or in addition to the aforementioned differential locks. Each brake could apply braking power to a freely turning wheel, which would transfer the power via the corresponding differential gear to the other wheel of the pair, which is able to transmit torque. In contrast to the case of the differential locks, the remaining operating wheel then would be driven with double the torque, that is, the total torque normally supplied to both wheels. The same advantage can be derived from brakes on the shafts leading to the two differential gears of the two wheel pairs for shifting power between the wheel pairs.

Finally, in an alternative embodiment, the front and back differential gears also are spring-biased active and hydraulically released, so that all differential locks will be closed when the drive system is not operating, e.g., is parked.

DETAILED DESCRIPTION OF THE PREFERRED EMBODIMENTS

Figure 1:
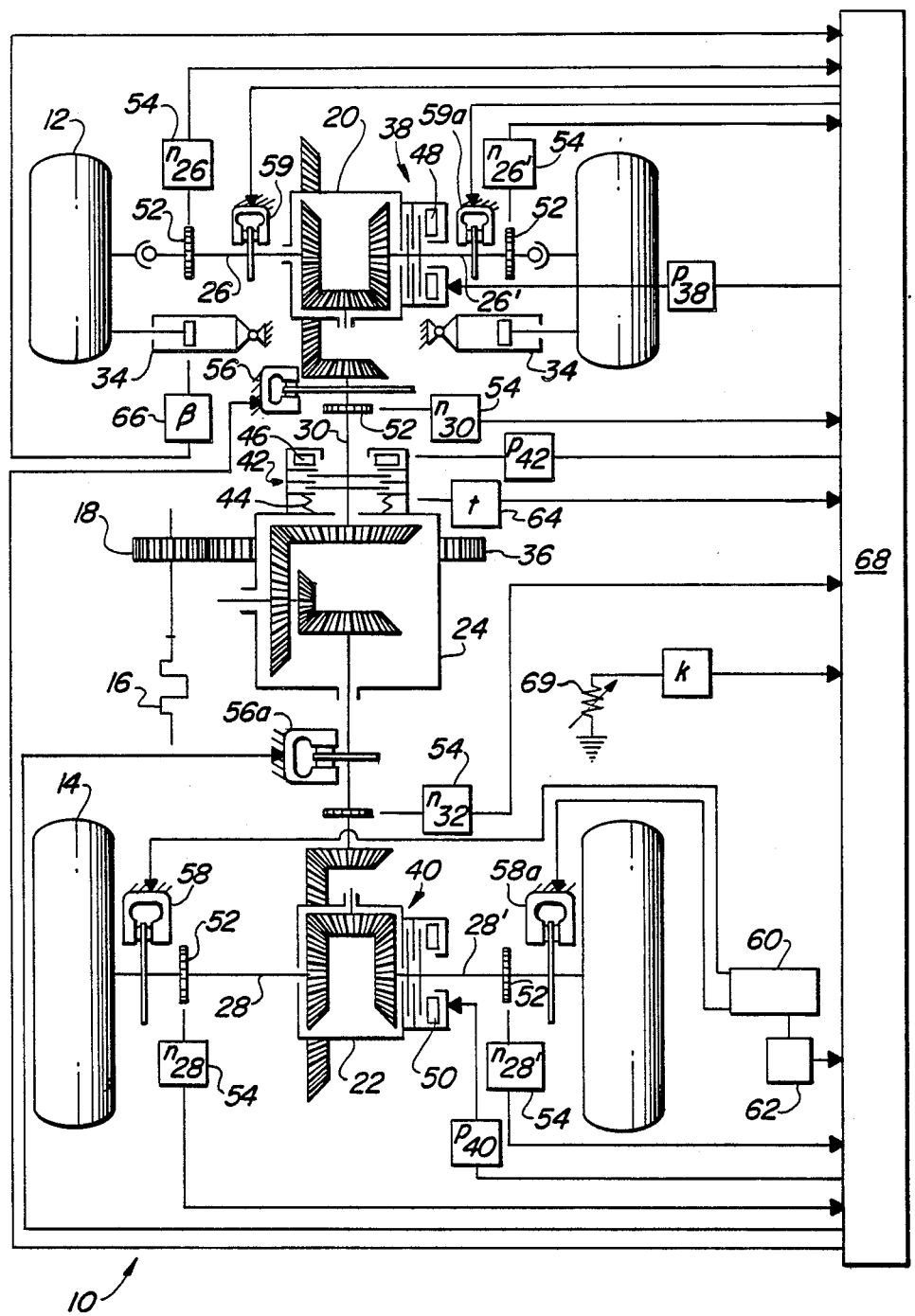
FIG. 1 shows a schematic arrangement of a motor vehicle with a drive system according to the present invention.

Referring to FIG. 1, a motor vehicle 10, e.g., an agricultural tractor, is equipped with front steerable wheels 12 and rear wheels 14, each of which comprise a pair of wheels and are driven as such. The drive to the wheels 12, 14 originates in an engine 16 and is appropriately adjusted in a transmission 18. A front differential gear 20 is provided for the front wheels 12 and a rear differential gear 22 for the rear wheels 14. An additional center differential gear 24 is provided between the transmission 18 and the front and rear differential gears 20, 22. Half shafts 26, 26' extend between the front differential gear 20 and each of the front wheels 12. Half shafts 28, 28' extend between the rear differential gear 22 and each of the rear wheels 14. Each half shaft 26, 26', 28, 28', is connected at one end to the associated differential gears 20, 22 for rotation therewith and at the other end to the wheels 12, 14 for rotation therewith, thereby transmitting power to the wheels. Drive shafts 30 and 32 extend between the center differential gear 24 and the front and rear differential gears 20 and 22, respectively.

The engine 16 and the transmission 18 are of conventional design. For example, a transmission of 12 forward speeds and 8 reverse speeds can be used to provide a maximum speed of 40 kilometers per hour. A ring gear 36 is rigidly connected to the center differential gear 24 to transmit driving power from the transmission 18 to the center differential gear 24.

The front wheels 12 may be pivoted in a horizontal plane by means of a steering arrangement 34, are attached to a front axle (not shown), and have a smaller outside diameter than the rear wheels 14. The axle loading of the front wheels 12, in this example, is 30% of the total load of the vehicle 10, so that it is preferable to have 30% of the available driving power transmitted by the front wheels 12. Similarly, it is preferable to have the remaining 70% of the driving power transmitted through the rear wheels 14.

The differential gears 20, 22, 24, are shown as bevel gear differentials, although planetary differential gears also could be used. The bevel gear ratios in the front and rear differentials 20, 22 are equal for both sides, so that the half shafts 26, 26', 28, 28' of each wheel pair 12, 14 can transmit equal power at equal rotational speeds. The bevel gear ratios in the center differential are unequal, so that 30% of the driving power is transmitted to the front wheels 12, when these exhibit a small amount of overrun, while 70% of the driving power is transmitted to the rear wheels 14.

The differential gears 20, 22, 24 are each equipped with differential locks 38, 40, 42, all of which use friction locking and can be applied under load. In this example, multi-disk clutches are shown for use as the differential locks 38, 40, 42. The differential lock 42 of the center differential gear 24 is applied by means of a Belleville spring 44, and is released by means of a hydraulic piston 46. The differential locks 38, 40 of the front and rear differential gears 20, 22 are applied by hydraulic pressure by means of hydraulic pistons 48, 50.

The front and rear half shafts 26, 26', 28, 28' are each rigidly connected to a sensor disk 52, each of which is associated with a sensor 54. Drive shafts 30, 32 are equipped with similar sensor disks 52, and sensors 54. Each of the sensors 54 associated with the half shafts 26, 26', 28, 28' determines the rotational speed of a wheel 12, 14, while the sensors 54 associated with the drive shafts 30, 32 determine the rotational speeds of the front and rear differential gears 20, 22.

The front drive shaft 30 is equipped with a brake 56, and the rear half shafts 28, 28' similarly each are equipped with a brake 58, 58a. Each of the brakes 56, 58, 58a can be operated independently or in conjunction with each other. Alternatively, the brake 56 mounted on the front drive shaft 30 (which operates upon both front wheels 12 simultaneously) could be replaced by separate brakes 59, 59a acting on each of the half shafts 26, 26'. Manual operation of the brakes 56, 58, 58a is accomplished by the usual brake arrangement 60 on an operator's platform (not shown). Manual brake application is detected by a sensor 62 (which can be the usual brake light switches) attached to the brake arrangement 60.

A sensor 64 is provided to determine the temperature at the differential lock 42 of the center differential gear 24, and a sensor 66 is provided to determine the steering angle $\beta$ of the front wheels 12.

Finally, the motor vehicle 10 contains a control circuit 68, which preferably includes a preprogrammed microprocessor, to which the values determined by sensors 54, 62, 64, 66 are supplied. The control circuit 68 also can be supplied with a correction signal k, provided via an operator adjustable input arrangement 69, shown here as a potentiometer, to permit calibration of the control circuit 68, e.g., to take into account differing tire sizes of the front and rear wheels 12, 14, or to adjust the desired overrun or underrun. After the control circuit 68 has operated upon the signals supplied to it by the sensors, it establishes output signals that control the pressures at the hydraulic pistons 46, 48, 50 of the differential locks 38, 40, 42.

A detailed description of the method of supplying pressure to the multi-disk clutches of the differential locks 38, 40, 42 will be omitted as this is conventional, using lines, electrically controlled valves, and at least one pump, where the pressure of the pump or the opening of the valves is controlled by the output signals of the control circuit 68.

Figure 2:
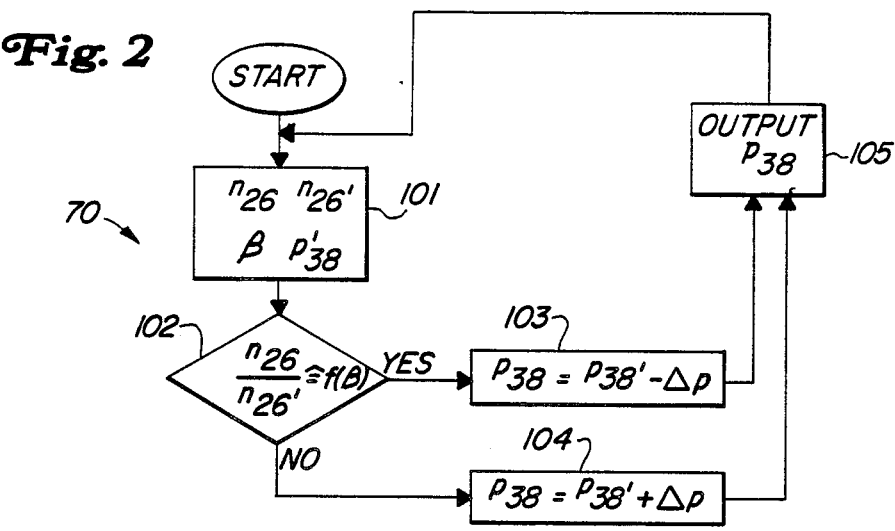
FIGS. 2–7 depict flow charts illustrating the logic for operation of the control circuit according to the present invention.

The operation of the differential locks by the control circuit 68 will now be described with reference to the flow charts set forth in FIGS. 2-4. The front differential lock sub-routine 70 is shown in FIG. 2, the rear differential lock sub-routine 74 in FIG. 4, and the center differential lock sub-routine 72 in FIG. 3. Each of the differential locks 38, 40, 42 is controlled by a separate sub-routine, which acts independently. Each subroutine generates a corresponding electrical pressure control signal $p_{38}$, $p_{40}$, and $p_{42}$ which is applied to conventional electrically operated pressure control devices (not shown) coupled with the corresponding differential lock. While only one control circuit is shown in FIG. 1, each sub-routine could even be executed by totally separate control circuits.

Turning first to the front sub-routine 70 in FIG. 2, in the first step 101, the control circuit 68 is supplied by the sensors 54 with the rotational speeds $n_{26}, n_{26'}$ of the front half shafts 26, 26', and by the sensor 66 with the steering angle $\beta$ of the front wheels 12. In addition, the pressure $p_{38}'$ on the front differential lock 38 generated during the previous cycle is read from the memory (not shown) of the control circuit (it is assumed to have a predetermined value, e.g., 0, on the first cycle). Next, in step 102, the control circuit 68 calculates the ratio of $n_{26}$ to $n_{26'}$ and compares it to a stored ideal reference value (e.g., for Ackermann steering) of that ratio for the steering angle $\beta$ detected by the sensor 66. If the stored ratio roughly corresponds (within, e.g., $\pm 3\%$) to the ratio of the measured values, the control circuit 68 goes to step 103 and adjusts the value for the pressure $p_{38}$ at the differential lock 38 to reduce it by a small amount $\Delta p$. If the ratio of the measured values is significantly (more than 3%) greater or less than the stored value for the given steering angle $\beta$, the control circuit 68 goes to step 104 and increases the value for the pressure $p_{38}$ at the front differential lock 38 by the amount $\Delta p$. The exact value of $\Delta p$ will vary, depending upon the sensitivity of the system, the accuracy of the valves used and the interval between the readings. Using a maximum pressure of 10 bar, a $\Delta p$ of about 0.1 bar will generally be accurate enough. In addition, the size of the increment $\Delta p$ can be equal in either direction, or can be larger when increasing the pressure than when decreasing the pressure, as desired. The actual pressure at the front differential lock is set to the revised value $p_{38}$ in step 105. After a fixed time interval that may be seconds or fractions of seconds, the sub-routine 70 starts over, taking new measurements of the values of $n_{26}$, $n_{26'}$ and $\beta$, and repeating the procedure described. So long as the control circuit 68 is activated, the query is performed continuously at regular time intervals, so that a new value for the pressure $p_{38}$ at the differential lock 38 can be developed immediately upon any change in operating conditions at the front wheels 12.

Figure 4:
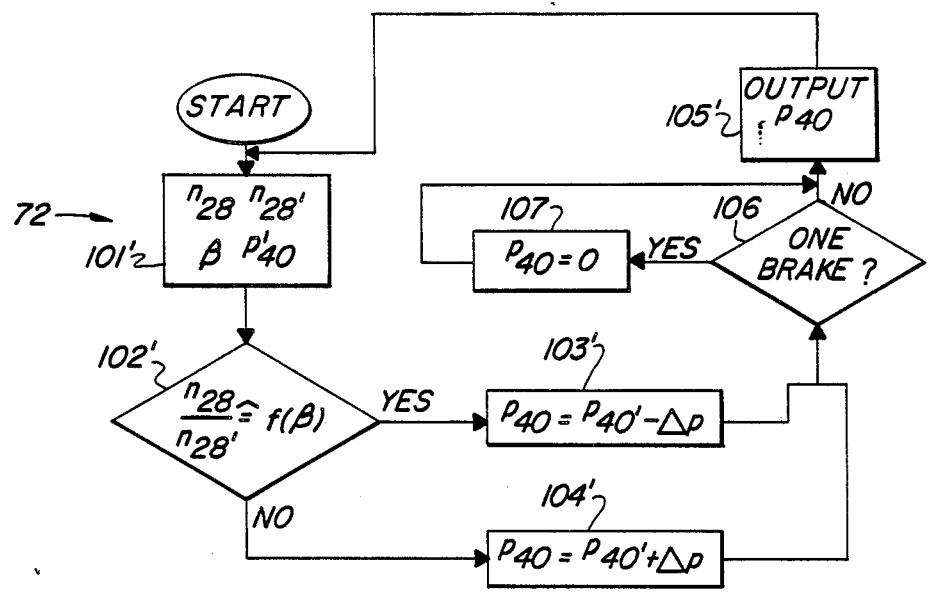

The rear sub-routine 72 shown in FIG. 4 generally corresponds to that for the front sub-routine 70, except that the rotational speeds $n_{28}$, $n_{28'}$ and pressure $p_{40}$ on the rear half shafts 28, 28' and rear differential lock 40, respectively, are used in place of their corresponding elements in the front sub-routine 70. Additional steps also are provided. The half shafts 28, 28' can be individually braked by the brakes 58, 58a. This normally is done to assist in turning. When such steering braking is underway, it is preferable for the rear differential 40 to be fully released. Accordingly, a step 106 is added before step 105' (corresponding to step 105) to determine if one, but not both, of the rear brakes is being applied by checking the signal generated by sensor 62. If so, the pressure $p_{40}$ is set to 0 in step 107 to fully release the differential lock. Otherwise, the algorithm executed by control circuit 68 proceeds directly to step 105', and the value of the pressure $p_{40}$ previously determined is provided to the differential lock. Again, the query is repeated at regular time intervals.

Figure 3:
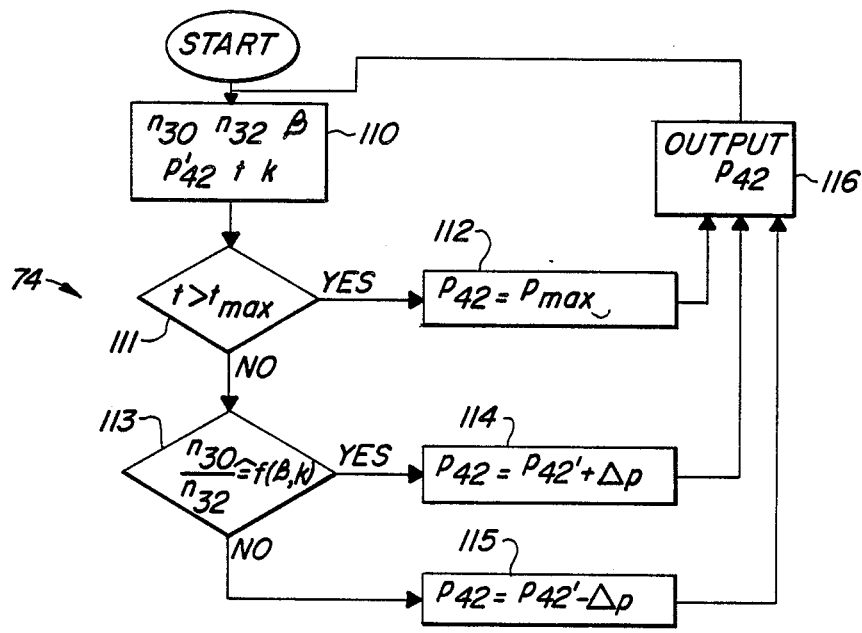

Turning to the center sub-routine 74 shown in FIG. 3, in step 110, the rotational speeds $n_{30}$, $n_{32}$ of the drive shafts 30, 32 are read from sensors 54, the temperature t at the multidisk clutch of the center differential lock 42 is read from sensor 64, the value of the steering angle $\beta$ is read from sensors 66 and the correction factor k is read from the input arrangement 69. The pressure $p_{42}'$ at the center differential lock 42 generated from the previous cycle is read from memory (or is assumed to be 0 on the first cycle).

In step 111, the control circuit 68 checks the temperature t to see if it exceeds a maximum temperature $t_{max}$ stored in the control circuit memory. If so, in step 112 the pressure $p_{42}$ is set to the maximum pressure $p_{max}$, which will fully open the differential lock 42. A typical maximum temperature $t_{max}$ for molybdenum coated paper facings would be about 180° C. If desired, it also would be possible to add an intermediate temperature value above which the pressure at $p_{42}$ would not be changed, whereby the pressure at the multi-disk clutch would be maintained at a constant rate.

Assuming the temperature is below the maximum temperature, or the optional intermediate temperature, in step 113 the control circuit 68 calculates the ratio of the speeds $n_{30}$ and $n_{32}$ compares the calculated ratio to a stored ideal reference value of the ratio for the given steering angle $\beta$. Again, if the value of the stored ratio roughly corresponds to the ratio of the measured values, the pressure $p_{40}$ at the lock 42 is increased in step 114 by a small amount $\Delta p$, whereas if it does not, it is decreased in step 115 by a small amount $\Delta p$. The value of the correction factor k is included in establishing the value of the reference ratio, so that the changes in tire size and desired underrun or overrun can be considered. The actual pressure at the center differential lock 42 is set to the new value of $p_{42}$ in step 116, and the entire process starts over a short time later.

As can be seen, the three control systems operate completely independently of each other. The differential locks 38, 40 associated with the wheel pairs 12, 14 will be closed upon occurrence of slip at any of the wheels 12 and/or 14. However, the center differential lock 42 will only be activated if there is slip between the two pairs of wheels 12, 14.

It also is possible to arrange the differential locks 38, 40 to be biased into engagement and hydraulically opened, much as the center differential lock 42 is shown in FIG. 1. This has the advantage that all of the differential gears 20, 22, 24 are locked when the motor vehicle 10 is not operating, and are opened only under favorable circumstances.

As previously noted, separate brakes 58, 58a, 59, 59a may be provided on each of the wheels 12, 14, which makes it possible to brake any one slipping wheel 12, 14 or pair of wheels 12, 14. Power then is transmitted to the individual wheel in a pair or to the pair of wheels 12, 14 able to absorb the torque. If an additional brake 56a is added to drive shaft 32, brakes 56, 56a, 58, 58a, 59, 59a can supplement or even entirely replace the differential locks 38, 40, 42. Application of pressure to apply the brakes will be derived by the control circuit 68 in a fashion similar to that just described for the differential locks, as shown in FIGS. 5-7.

Figure 5:
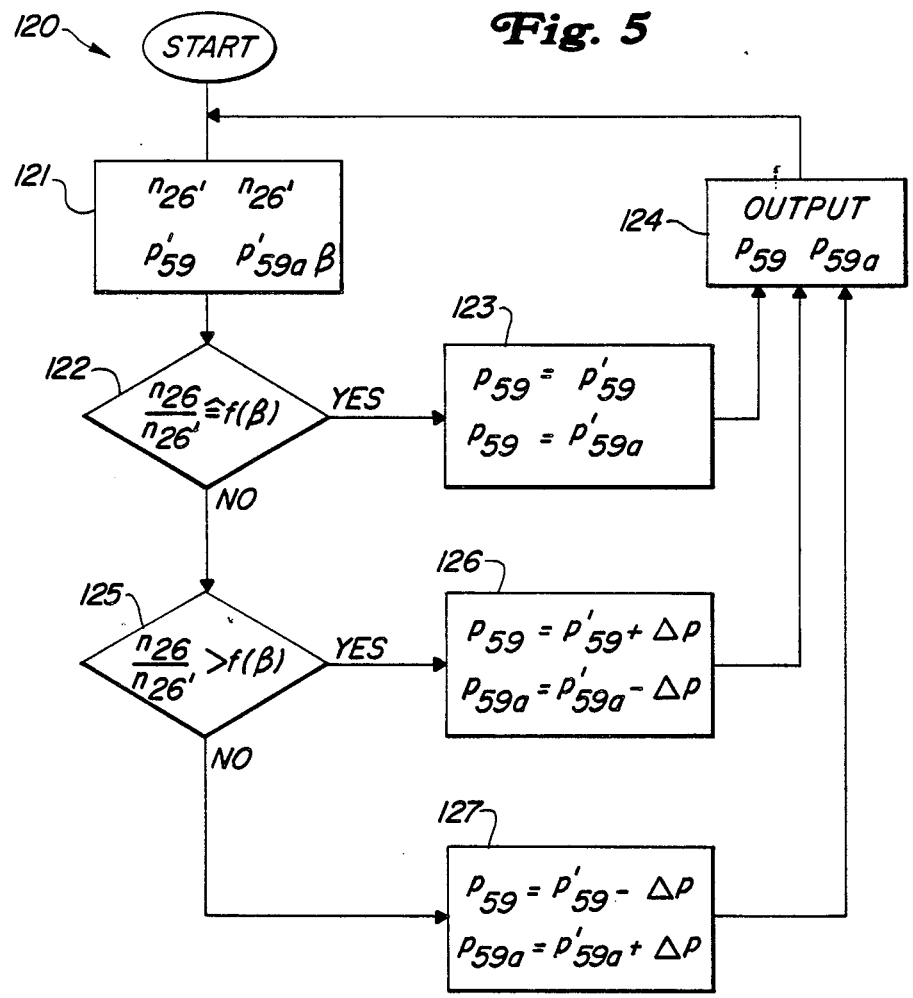

Turning first to the front brake sub-routine 120 shown in FIG. 5, in the first step 121, the control circuit 68 is supplied by the sensors 54 with the rotational speeds $n_{26}$, $n_{26'}$ of the front half shafts 26, 26', and by the sensor 66 with the steering angle $\beta$ of the front wheels 12. In addition, the pressures $p_{59}'$, $p_{59}'$ on the front brakes 59, 59a, generated during the previous cycle, are read from the memory of the control circuit (or assumed to have a predetermined value, e.g., 0, on the first cycle). Next, in step 122, the control circuit 68 calculates the ratio $n_{26}$ to $n_{26'}$ and compares it to a stored ideal reference value of that ratio for the steering angle $\beta$ detected by the sensor 66. If the reference value roughly corresponds to the ratio of the measured values, the control circuit 68 goes to step 123. There, the control circuit 68 sets the new values of $p_{59}$ and $p_{59a}$ equal to the old values, $p_{59}'$ and $p_{59a}'$, since they are the approximately correct values. The control circuit 68 then goes to step 124 where the actual pressure at the brakes 59, 59a is set equal to the new pressures $p_{59}$, $p_{59a}$.

If the calculated ratio of $n_{26}$ to $n_{26'}$ does not roughly correspond to the ideal stored value for this ratio, the control circuit 68 goes to step 125, where it determines if the measured ratio is greater than the stored ideal ratio. If it is, this means the shaft 26 is moving too fast relative to the shaft 26', i.e., that the braking on the shaft 26 should be increased and the braking on the shaft 26' decreased. Accordingly, in step 126, the control circuit 68 sets the new value for $p_{59}$ to equal the old value of $p_{59}'$ plus a small increment $\Delta p$ and the new value of $p_{59a}$ to equal the old value of $p_{59a}'$ minus a small increment $\Delta p$. The opposite pressures are increased and decreased in step 127 if the measured ratio of $n_{26}$ to $n_{26'}$ is not greater than the stored ideal ratio. From either step 126 or 127, the control circuit 68 goes to step 124, where it sets the actual pressure at the brakes 59, 59a to equal to the new pressures $p_{59}$, $p_{59a}$.

Figure 6:
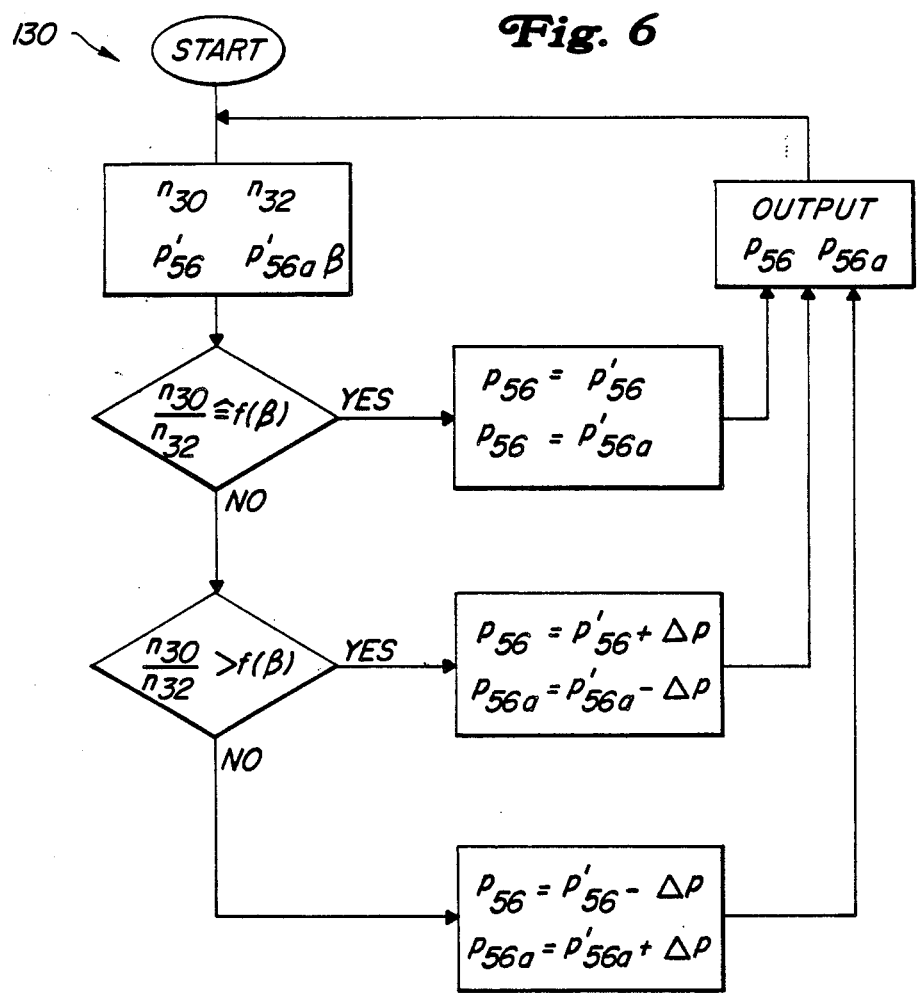
Figure 7:
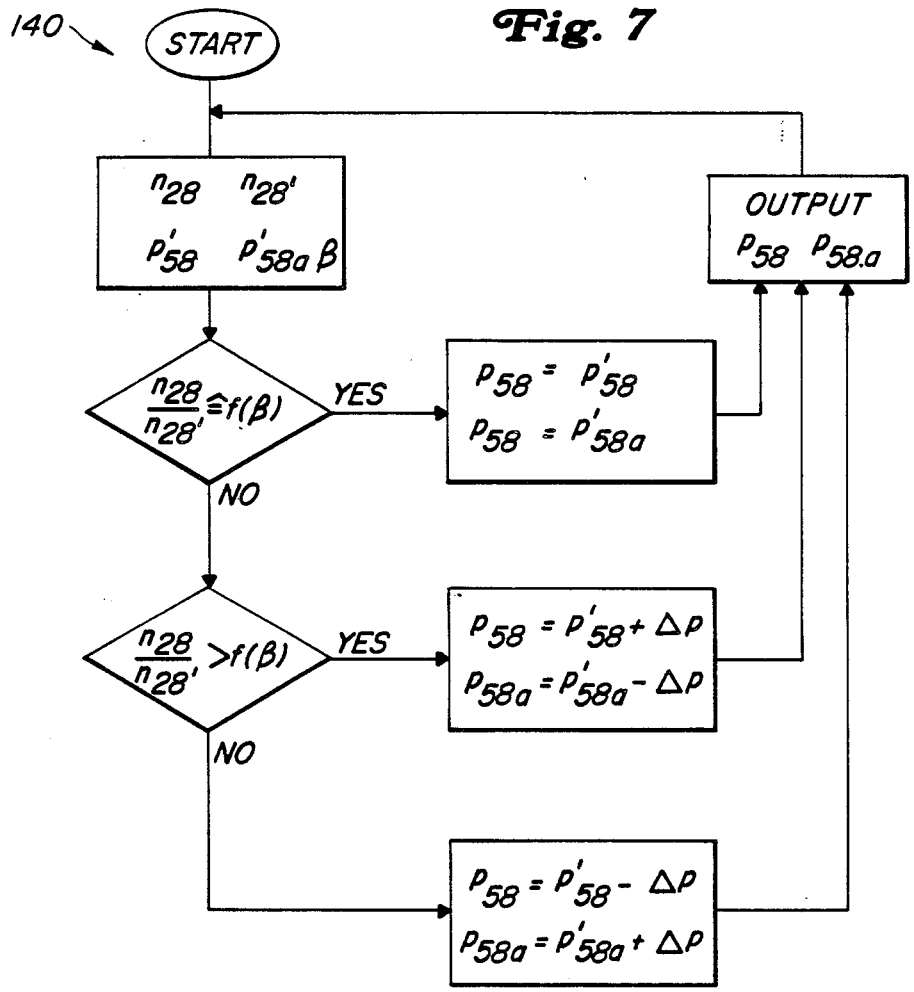

The flow charts 130 and 140 shown in FIGS. 6 and 7 for the brakes 56, 56a and 58, 58a, respectively, are substantially identical to the flow chart shown in FIG. 5, except that the appropriate values are substituted for $n_{26}$, $n_{26'}$, $p_{59}$, $p_{59a}$, namely, $n_{30}$, $n_{32}$, $p_{56}$, $p_{56a}$ in FIG. 6 and $n_{28}$, $n_{28'}$, $p_{58}$, $p_{58a}$ in FIG. 7.

The flow charts shown in FIGS. 5-7 are based on the assumption that no braking is underway to slow the vehicle or aid in steering. If vehicle slowing braking is underway, appropriate constant factors would simply be added to the various output pressures to assist in vehicle steering. For steering braking, pressure could be added to the output pressures for the rear brakes, with different amounts to each wheel, depending on the direction of turn.

While the present invention has been described with reference to particular preferred embodiments, it is to be understood that one of ordinary skill in the art could make various modifications thereto without exceeding the scope of the present invention. Accordingly, the present invention is limited only by the following claims.

We claim:

1. A drive system for a motor vehicle, comprising:
   a front pair and a rear pair of wheels, at least one pair of which can be steered;
   a front differential and a rear differential, each drivably connected to a respective one of said front and rear wheel pairs;
   a center differential drivably connected to said front and rear differentials;
   adjustment means comprising a gradually engageable lock for each said differential for adjusting the speeds of any relative rotation within each of said differentials;
   a sensor for determining a steering angle of said steerable pair of wheels;
   a plurality of wheel speed sensors, each determining a rotational speed of a corresponding one of said wheels;
   a plurality of differential speed sensors, each determining a rotational speed of a corresponding one of said front and rear differentials; and
   a control circuit including means for controlling said adjustment means based upon the sensed steering angle and rotational speeds, said control circuit comprising:
      means for calculating the ratio of the sensed rotational speeds of said front wheels;
      means for comparing said calculated ratio to a reference value corresponding to the sensed steering angle; and
      means for decreasing the degree of locking of said front differential by a first predetermined amount if said calculated ratio corresponds to said reference value, and for increasing the degree of locking of said front differential by a second predetermined amount if said calculated ratio does not correspond to said reference value.

2. The drive system according to claim 1, wherein said first and second predetermined amounts are the same.

3. The drive system according to claim 1, further comprising:
   an independent operable brake for each rear wheel; and
   sensor means for detecting when each brake is activated.

4. A drive system for a motor vehicle, comprising:
   a front pair and a rear pair of wheels, at least one pair of which can be steered;
   a front differential and a rear differential, each drivably connected to a respective one of said front and rear wheel pairs;
   a center differential drivably connected to said front and rear differentials;
   adjustment means comprising a gradually engageable lock for each said differential for adjusting the speeds of any relative rotation within each of said differentials;
   an independently operable brake for each rear wheel;
   sensor means for detecting when each brake is activated;
   a sensor for determining a steering angle of said steerable pair of wheels;
   a plurality of wheel speed sensors, each determining a rotational speed of a corresponding one of said wheels;
   a plurality of differential speed sensors, each determining a rotational speed of a corresponding one of said front and rear differentials; and
   a control circuit including means for controlling said adjustment means based upon the sensed steering angle and rotational speeds, said control circuit comprising:
      means for calculating the ratio of the sensed rotational speeds of said rear wheels;
      means for comparing said calculated ratio to a reference value corresponding to the sensed steering angle; and
      means for fully unlocking said rear differential, if one but not both of said brakes are activated, and otherwise decreasing the degree of locking of said rear differential by a first predetermined amount if said calculated ratio corresponds to said reference value, and for increasing the degree of locking of said rear differential by a second predetermined amount if said calculated ratio does not correspond to said reference value.

5. The drive system according to claim 4, wherein said first and second predetermined amounts are the same.

6. A drive system for a motor vehicle, comprising:
   a front pair and a rear pair of wheels, at least one pair of which can be steered;
   a front differential and a rear differential, each drivably connected to a respective one of said front and rear wheel pairs;
   a center differential drivably connected to said front and rear differentials;
   adjustment means comprising a gradually engageable lock for each said differential for adjusting the speeds of any relative rotation within each of said differentials;
   an independently operable brake for each rear wheel;
   sensor means for detecting when each brake is activated;
   a sensor for determining a steering angle of said steerable pair of wheels;
   a plurality of wheel speed sensors, each determining a rotational speed of corresponding one of said wheels;
   a plurality of differential speed sensors, each determining a rotational speed of a corresponding one of said front and rear differentials; and
   a control circuit including means for controlling said adjustment means based upon the sensed steering angle and rotational speeds, said control circuit comprising:

means for calculating the ratio of the sensed rotational speeds of said front and rear differentials;

means for comparing said rear differentials;

means for comparing said calculated ratio to a reference value corresponding to the sensed steering angle; and means for decreasing the degree of locking of said center differential by a first predetermined amount if said calculated ratio corresponds to said reference value, and for increasing the degree of locking by a second predetermined amount if said calculated ratio does not correspond to said reference value.

7. The drive system according to claim 6, wherein said first and second predetermined amounts are the same.

8. The drive system according to claim 6, further comprising a sensor for detecting the temperature of said center differential, and wherein said control circuit comprises means for fully unlocking said center differential if the sensed temperature exceeds a predetermined value.

9. The drive system according to claim 6, further comprising adjustment means for adjusting said reference value.

10. The drive system according to claim 9, wherein said center differential further comprises spring means for biasing the corresponding lock into engagement.

11. The drive system according to claim 6, wherein said center differential distributes driving torque in proportion to the load distribution at said front and rear pairs of wheels.

12. The drive system according to claim 6, wherein said differential lock of said center differential is engaged by frictional means, and a sensor is provided to determine the temperature at said differential, the control circuit further including means for controlling the degree of locking of said center differential as a function of the second temperature.

13. The drive system according to claim 6, wherein said control circuit fully opens said center differential lock if said sensed temperature exceeds a predetermined value.

14. The drive system according to claim 6, wherein all said differential locks are biased to a closed position.

* * * * *

UNITED STATES PATENT AND TRADEMARK OFFICE
CERTIFICATE OF CORRECTION

PATENT NO. : 4,895,217

DATED : 23 January 1990

INVENTOR(S) : Volker Hueckler et al.

It is certified that error appears in the above-identified patent and that said Letters Patent is hereby corrected as shown below:

In Column 9, line 5, delete "means for comparing said rear differentials;".

Signed and Sealed this

Thirtieth Day of April, 1991

Attest:

HARRY F. MANBECK, JR.

Attesting Officer

Commissioner of Patents and Trademarks